United States Patent
Bedi et al.

(10) Patent No.: US 6,460,915 B1
(45) Date of Patent: Oct. 8, 2002

(54) INTEGRATED BED SIDE STEP ASSEMBLY FOR VEHICLES

(75) Inventors: Gurminder Singh Bedi, Bloomfield Hills; Edward Andrew Pleet, Dearborn; Leslie Anne Hersh, Ann Arbor, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/686,703

(22) Filed: Oct. 11, 2000

(51) Int. Cl.[7] .............................................. B60R 27/00
(52) U.S. Cl. ....................... 296/183; 296/36; 296/151
(58) Field of Search ...................... 296/183, 36, 202, 296/146.1, 106, 62, 151; 244/129.6, 129.5

(56) References Cited

U.S. PATENT DOCUMENTS

| | | | | |
|---|---|---|---|---|
| 2,196,546 A | * | 4/1940 | Bowers | 244/19.5 |
| 2,453,937 A | | 11/1948 | Ray | |
| 2,531,263 A | * | 11/1950 | Fink et al. | 182/97 |
| 2,772,913 A | | 12/1956 | Holan et al. | |
| 2,910,255 A | | 10/1959 | Johnson | |
| 3,743,051 A | * | 7/1973 | Cramer | 182/15 |
| 3,833,253 A | * | 9/1974 | Butler | 296/165 |
| 3,961,809 A | | 6/1976 | Clugston | |
| 4,021,071 A | | 5/1977 | Norman | |
| 4,086,726 A | * | 5/1978 | Moses | 49/37 |
| 4,176,812 A | * | 12/1979 | Baker | 244/129.5 |
| 4,191,388 A | | 3/1980 | Barksdale | |
| 4,194,754 A | | 3/1980 | Hightower | |
| 4,453,684 A | * | 6/1984 | Hanks | 244/129.5 |
| 4,707,016 A | * | 11/1987 | McDonald | 296/39.2 |
| 4,848,821 A | | 7/1989 | Llewellyn | |
| 4,848,832 A | | 7/1989 | Starnes | |
| 4,861,096 A | | 8/1989 | Hastings | |
| 4,890,879 A | * | 1/1990 | Hurlock | 296/180.2 |
| 5,205,603 A | | 4/1993 | Burdette, Jr. | |
| 5,312,150 A | | 5/1994 | Quam | |
| 5,584,493 A | | 12/1996 | Demski et al. | |
| 5,590,925 A | | 1/1997 | Banks, Sr. | |
| 5,615,922 A | | 4/1997 | Blanchard | |
| 5,660,427 A | * | 8/1997 | Freeman et al. | 296/190 |
| 5,749,611 A | * | 5/1998 | Watson et al. | 292/336.6 |
| 5,816,638 A | | 10/1998 | Pool, III | |
| 5,941,342 A | | 8/1999 | Lee | |
| 6,030,018 A | | 2/2000 | Clare et al. | |
| 6,036,208 A | | 3/2000 | Frerichs | |

FOREIGN PATENT DOCUMENTS

JP        1-119445        5/1989

* cited by examiner

*Primary Examiner*—D. Glenn Dayoan
*Assistant Examiner*—Lori L. Coletta
(74) *Attorney, Agent, or Firm*—Raymond L. Coppiellie

(57) ABSTRACT

An integrated bed side step assembly is provided for a pick-up truck having a bed. The integrated bed side step assembly includes a body opening assembly forming one side of the bed and having an opening extending therethrough above a floor of the bed to allow access to an interior of the bed. The integrated bed side step assembly also includes a door assembly operatively cooperating with the body opening assembly to open and close the opening and having at least one step to allow an operator to step up into and access the interior of the bed.

20 Claims, 4 Drawing Sheets

“INTEGRATED BED SIDE STEP ASSEMBLY FOR VEHICLES

BACKGROUND OF THE INVENTION

1. Field of the Invention

The present invention relates generally to beds for vehicles and, more specifically, to an integrated bed side step assembly for a bed of a vehicle.

2. Description of the Related Art

It is known to provide a bed for a vehicle such as a pick-up truck. Typically, the bed is rectangular in shape to define a cargo area and is closed at the end by a tailgate. The tailgate is hinged to the bed to have an upright position to close the end of the bed and a down position to open the end of the bed.

It is known to provide an opening in a side of a bed of a vehicle such as a pick-up truck. An example of such a pick-up truck is disclosed in U.S. Pat. No. 4,861,096. In this patent, the pick-up truck has an opening in a side of the bed and a door mounted to the side of the bed to allow occupant ingress and egress to the bed of the pick-up truck.

One disadvantage of the above pick-up truck is that it does not allow stepped access to the bed. Another disadvantage is that the above pick-up truck does not provide access to the b ed when a cap is place over the bed of the pick-up truck. Therefore, there is a need in the art to provide a pick-up truck with a bed access step and opening and one that can also be used with a cap over the bed of the pick-up truck.

SUMMARY OF THE INVENTION

Accordingly, the present invention is an integrated bed side step assembly for a vehicle having a bed. The integrated bed side step assembly includes a body opening assembly forming one side of the bed and having an opening extending therethrough above a floor of the bed to allow access to an interior of the bed. The integrated bed side step assembly also includes a door assembly operatively cooperating with the body opening assembly to open and close the opening and having at least one step to allow an operator to step up into and access the interior of the bed.

One advantage of the present invention is that an integrated bed side step assembly is provided for a vehicle such as a pick-up truck. Another advantage of the present invention is that the integrated bed side step assembly has an opening in a side of a bed of a pick-up truck and a side access door that allows occupants to simply step into the bed and to access cargo placed in the bed of the pick-up truck. Yet another advantage of the present invention is that the integrated bed side step assembly incorporates a side access door for a bed of a pick-up truck that provides occupants with an unique step into the bed and provides access to the bed from the side of the bed of the pick-up truck. Still another advantage of the present invention is that the integrated bed side step assembly can also be used with a cap over the bed of the pick-up truck.

Other features and advantages of the present invention will be readily appreciated, as the same becomes better understood after reading the subsequent description when taken in conjunction with the accompanying drawings.

DESCRIPTION OF THE PREFERRED EMBODIMENT(S)

Figure 1:
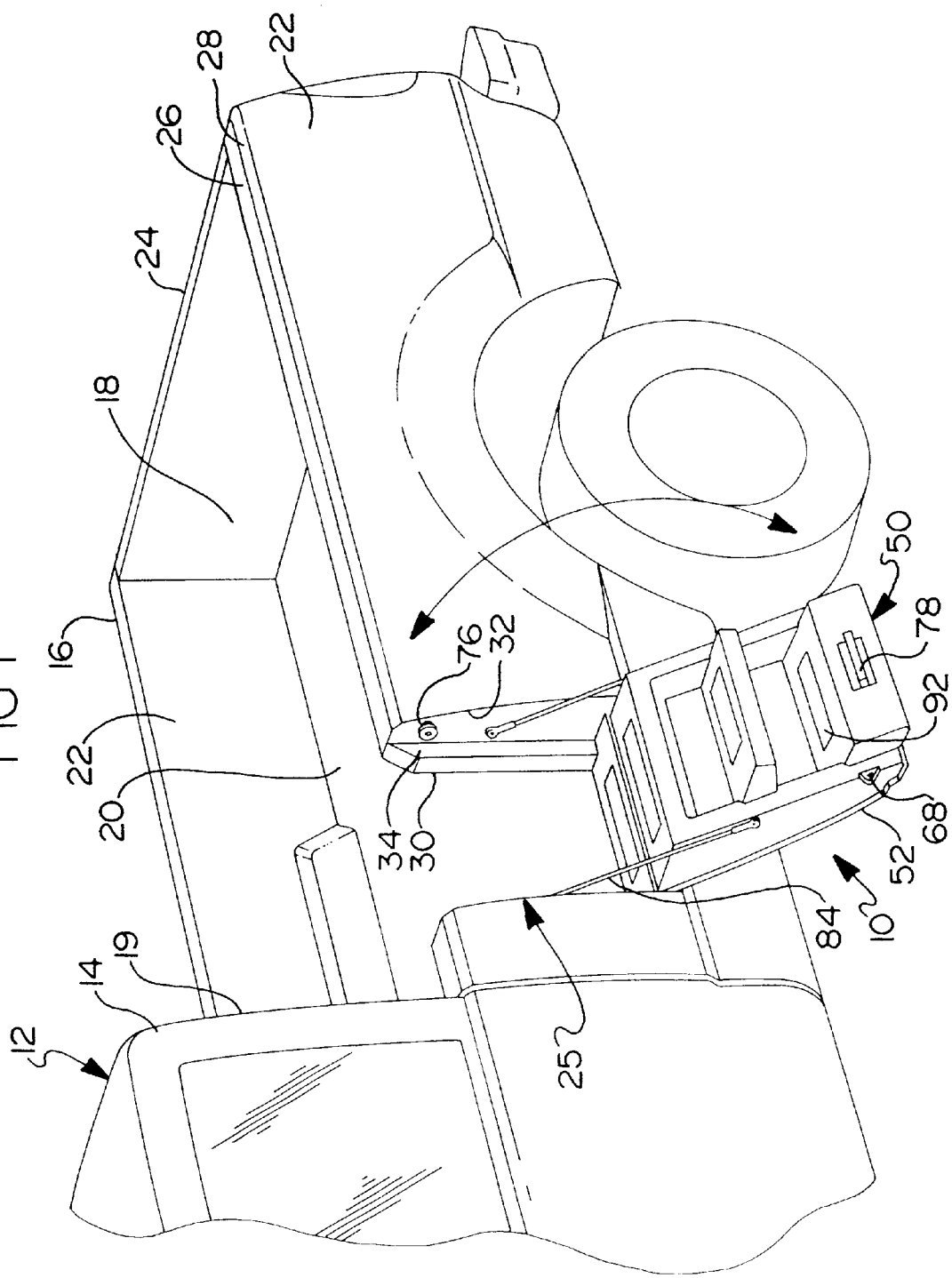
FIG. 1 is a perspective view of an integrated bed side step assembly, according to the present invention, illustrated in operational relationship with a pick-up truck.
Figure 2:
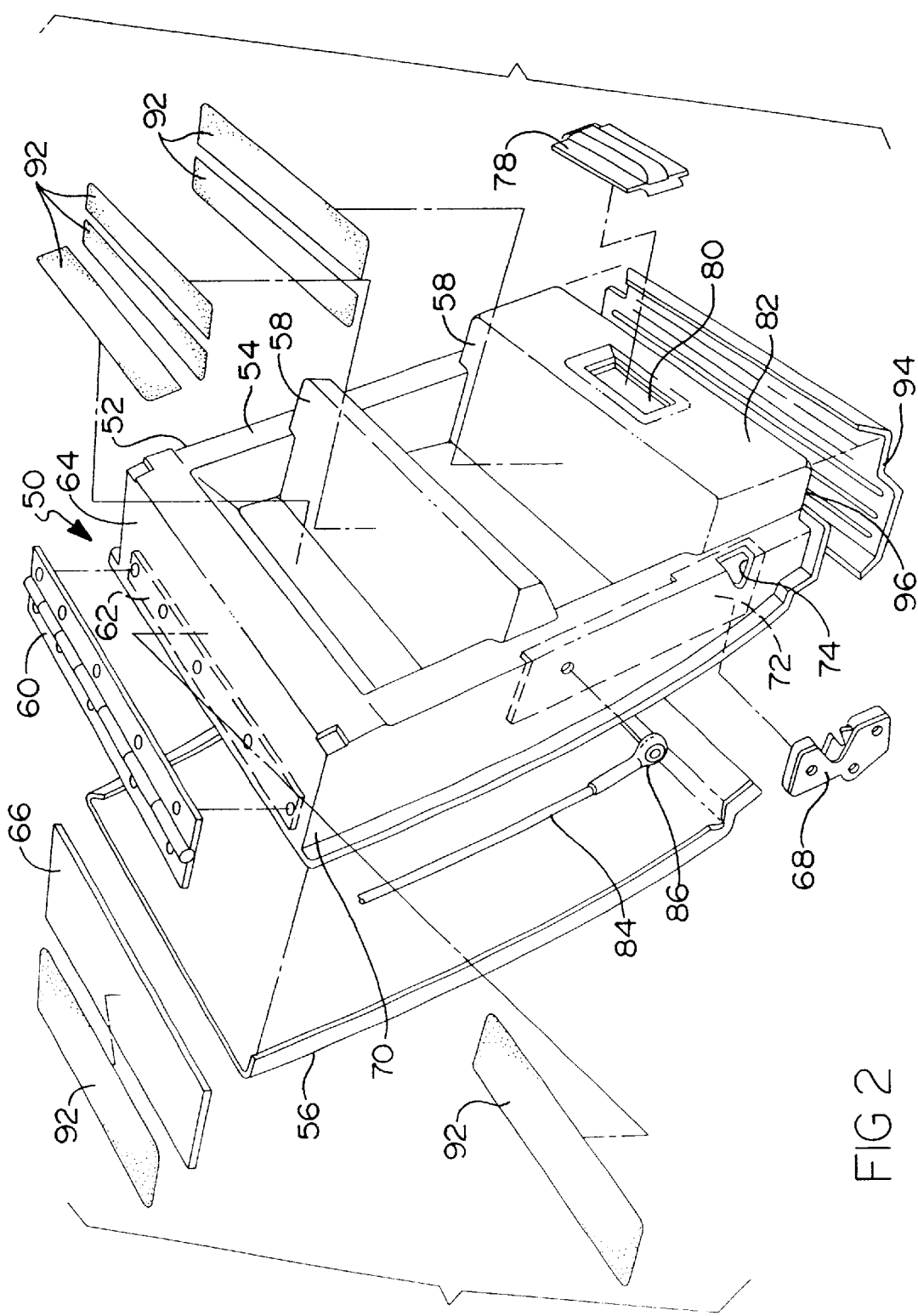
FIG. 2 is an exploded perspective view of the integrated bed side step assembly and pick-up truck of FIG. 1.
Figure 3:
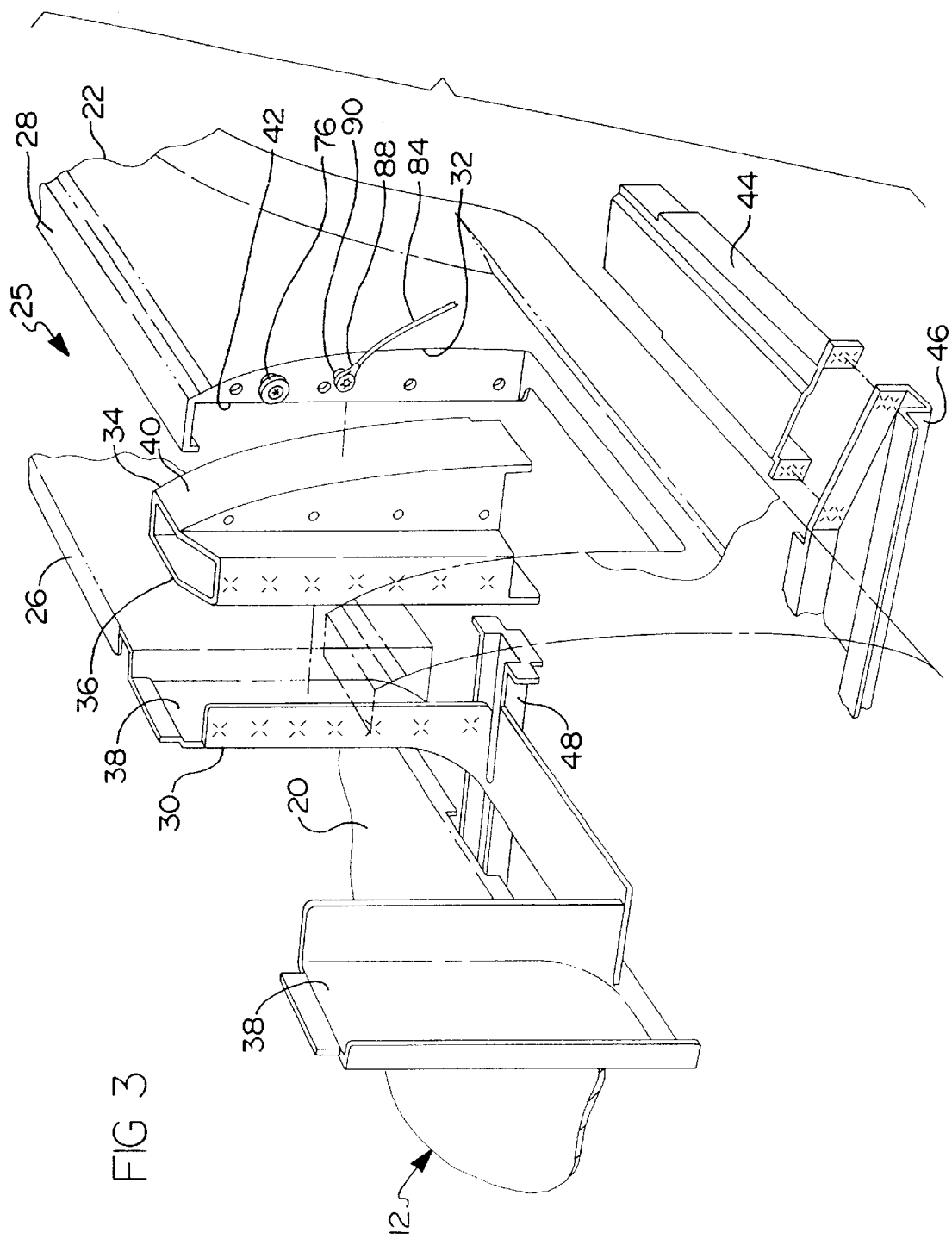
FIG. 3 is an exploded perspective view of a portion of the integrated bed side step assembly and pickup truck of FIG. 1.

Referring now to the drawings and in particular FIGS. 1 through 3, one embodiment of an integrated bed side step assembly 10, according to the present invention, is illustrated in connection with a vehicle such as a pick-up truck, generally indicated at 12. Such pick-up trucks 12 typically include a cab 14 and a bed 16 forming a cargo area 18. The bed 16 includes a front 19, floor 20, two sides 22, and a rear tailgate 24, which define the cargo area 18. It should be appreciated that, except for the integrated bed side step assembly 10, the pick-up truck 12 is conventional and known in the art.

Referring to FIGS. 1 through 3, the integrated bed side step assembly 10 includes a bed opening assembly, generally indicated at 25, in one of the sides 22 of the bed 16. The bed opening assembly 25 has an inner panel 26 extending longitudinally and connected to the floor 20 by suitable means such as welding. The bed opening assembly 25 also includes an outer panel 28 extending longitudinally and connected to the inner panel 26 by suitable means such as fasteners or welding. The inner panel 26 has an opening 30 extending laterally therethrough. The opening 30 is generally rectangular in shape. The outer panel 28 has an opening 32 extending laterally therethrough. The opening 32 is generally rectangular in shape and greater in longitudinal length than the opening 30. The inner panel 26 and outer panel 28 are made of metal material.

The bed opening assembly 25 also includes a pillar assembly 34 disposed on both sides of the openings 30 and 32. The pillar assembly 34 has an inner portion 36 that extends vertically and is generally hollow and rectangular in shape. The inner portion 36 is disposed in a recess 38 formed in the inner panel 26 adjacent the opening 30 and secured to the inner panel 26 by suitable means such as welding. The pillar assembly 34 also has an outer portion 40 that extends vertically and laterally from the inner portion 36. The outer portion 40 is generally hollow and rectangular in shape. The outer portion 40 is disposed in a recess 42 formed in the outer panel 40 adjacent the opening 32 and secured to the outer panel 28 by suitable means such as fasteners (not shown). The pillar assembly 34 may be either a one-piece member or a two-piece construction. The pillar assembly 34 is made of a metal material. It should be appreciated that the both pillar assemblies 34 are secured to a rail 44 to be described by suitable means such as welding to form a generally "U" shaped structure around the openings 30 and 32.

The bed opening assembly 25 also includes a rail 44 extending longitudinally along the side 22 and below the floor 20 of the bed 16. The rail 44 is secured to the inner panel 28 by suitable means such as welding. The bed opening assembly 25 includes a first bed cross member 46 secured at one end to the rail 44 by suitable means such as welding. The bed opening assembly 25 includes a second bed cross member 48 extending laterally and spaced longitudinally from the first bed cross member 46 below the floor 20 of the bed 16. The second bed cross member 48 is secured at one end to the rail 44 by suitable means such as welding. The rail 44, first bed cross member 46, and second bed cross member 48 are made of a metal material. It should be appreciated that the rail 44, first bed cross member 46, and second bed cross member 48 are also secured to the floor 20 by suitable means such as welding.

The integrated bed side step assembly 10 also includes a door assembly, generally indicated at 50, for opening and closing the opening 32. The door assembly 50 includes a door 52 having an inner panel 54 and an outer panel 56 joined together by suitable means such as a hem flange. The inner and outer panels 54 and 56 have a predetermined shape, preferably a generally rectangular in shape. The inner and outer panels 54 and 56 are made of rigid material such as a composite material. The door 52 also has at least one, preferably a plurality of, more preferably two, steps 58 molded into the inner panel 54 for ease of entry into the cargo area 18 of the bed 16. The steps 58 have a predetermined shape, preferably a generally rectangular shape. It should be appreciated that the outer panel 56 of the door 52 is molded to match an outer surface or contour of the outer panel 26 of the bed opening assembly 25.

The door assembly 50 also includes a hinge 60 to attach the door 52 to the rail 44 of the bed opening assembly 25. The hinge 60 extends longitudinally and is of a piano type. The hinge 60 is connected on one lateral side to a hinge reinforcement 62 disposed within the inner panel 54 beneath an upper surface 64 thereof by suitable means such as fasteners (not shown). The hinge reinforcement 62 is made of metal material such as steel. The hinge 60 is also connected on the other lateral side to the rail 44 by suitable means such as fasteners (not shown). It should be appreciated that the door assembly 50 may include a spring-loaded assist mechanism (not shown) to aid in the opening and closing of the door 52. It should also be appreciated that the assist mechanism allows the door 52 to open slower as it passes a ninety degree (90°) point and will also reduce the amount of effort required to close the door 52.

The door assembly 50 also includes a hider plate 66 disposed over one side of the hinge 60 to bridge a step between the door 52 and the floor 20. The hider plate 64 is secured to the inner panel 24 of the bed opening assembly 25 by suitable means such as welding. It should be appreciated that the hider plate 64 is optional. It should also be appreciated that the door 52 is attached to the bed opening assembly 25 via the hinge 60 similar to the tailgate 24.

The door assembly 50 also includes a latch assembly 68 on both sides of the door 52 to latch the door 52 to the bed opening assembly 25. The latch assembly 68 is of a conventional type and similar to the latch assemblies (not shown) for the tailgate 24. The latch assembly 68 is disposed on each longitudinal side 70 of the inner panel 54 and connected to a reinforcement plate 72 disposed within the inner panel 54 and connected to the longitudinal side 70 thereof by suitable means such as fasteners (not shown). The reinforcement plate 72 is made of metal material such as steel. The latch assembly 68 is exposed through an opening 74 in the longitudinal side 70 of the inner panel 54. The door assembly 50 also includes a striker 76 connected to the outer panel 26 on each longitudinal side of the opening 32 suitable means such as fasteners (not shown). The striker 76 is of a conventional type and similar to the strikers (not shown) for the tailgate 24. It should be appreciated that the striker 76 cooperates with the latch assembly 68 to latch the door 52 in a closed position within the opening 32 similar to the tailgate 24.

The door assembly 50 includes a handle 78 connected to the door 52 to aid in lifting and lowering the door 52. The handle 78 is of a conventional type and similar to the handle (not shown) for the tailgate 24. The handle 78 is partially disposed in a handhold recess 80 in an outward surface 82 of the inner panel 54. The handle 78 is secured to the inner panel 54 by suitable means such as fasteners (not shown). It should be appreciated that the handle 78 may be located on the outer panel 56 to be visible. It should also be appreciated that the handle 78 is similar to that for the tailgate 24.

The door assembly 50 also includes a cable 84 disposed on each side of the door 52 to aid in lifting and lowering the door 52. The cable 84 is of a conventional type and similar to the cables (not shown) for the tailgate 24. The cable 84 has a first end 86 attached to the reinforcement plate 72 by suitable means such as fasteners (not shown). The cable 84 also has a second end 88 attached to the outer panel 26 on each longitudinal side of the opening 32 by suitable means such as a fastener 90.

The door assembly 50 further includes at least one, preferably a plurality of skid pads 92 disposed on the steps 58, inner panel 54, and hider plate 66. The skid pads 92 are of a rough or abrasive material attached to the steps 58, inner panel 54, and hider plate 66 by suitable means such as adhesive. It should be appreciated that the skid pads 92 provide a non-skid surface to resist foot slippage by a user.

The door assembly 50 further includes a door trim molding or top cover 94 for the door 52. The cover 94 has a shape to match a contour of a bottom surface 96 of the inner panel 54 to overlap the bottom surface 96 of the door 52. The cover 94 is made of a rigid material such as metal or plastic. It should be appreciated that the cover 96 may be attached to the door 52 by suitable means such as an adhesive.

In operation of the integrated bed side step assembly 10, during normal operating conditions, the door 52 is located in the side 22 of the bed 16 in an up or closed position in the opening 32 of the bed opening assembly 25. An operator moves the handle 78 to actuate the latches 68 to disengage the latches 68 from the strikers 76. The door 52 is lowered and rotated via the hinge 60 to a down or open position in a similar fashion to an airplane and drop away from the side 22. With the door 52 in an open position as illustrated in FIG. 1, the operator is allowed to step up into the cargo area 18 of the bed 16 using the steps 58 of the door 52, accessing the cargo area 18. Once the door 52 is in the down or open position, the operator can access the cargo area 18 located in the bed 16 through the openings 30 and 32. It should be appreciated that the operation is reversed for closing the door 52.

Figure 4:
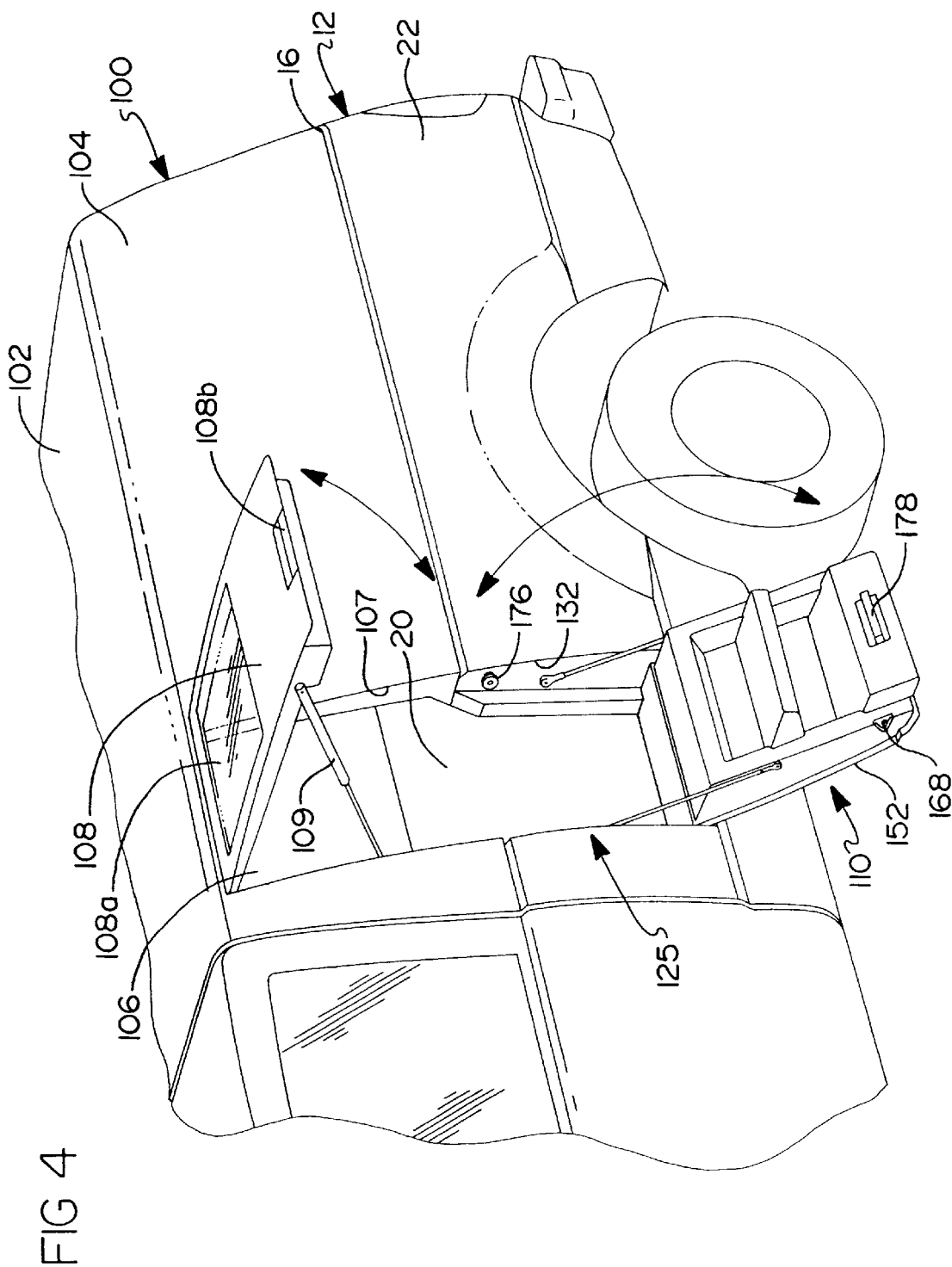
FIG. 4 is a perspective view of another embodiment, according to the present invention, of the integrated bed side step assembly of FIG. 1.

Referring to FIG. 4, another embodiment 110, according to the present invention, of the integrated bed side step assembly 10 is shown. Like parts of the integrated bed side step assembly 10 have like references numerals increased by one hundred (100). In this embodiment, the integrated bed side step assembly 110 allows the operator to step into the cargo area 18 of the bed 16 when the pick-up truck 12 is fitted with a box or bed cap, generally indicated at 100. The bed cap 100 is disposed over the cargo area 18 between the sides 22 of the bed 16 adjacent the front 19 and tailgate 24 thereof. The bed cap 100 is generally rectangular in shape. The bed cap 100 has a top 102 and sides 104 extending generally perpendicular thereto to form a chamber 106 therein. One of the sides 104 of the bed cap 100 includes at least one opening 107 extending therethrough. The bed cap 100 is secured to the sides 22 by fasteners (not shown). The integrated bed side step assembly 110 includes a door 108 attached to the bed cap 100 by suitable means such as a hinge (not shown). The door 108 may include a window 108a and a handle 108b to actuate a latch (not shown), which may cooperate with a striker (not shown) on the door 152 or sides 104. The integrated bed side step assembly 110 may include an assist mechanism 109 such as a damper to assist in the opening and closing of the door 108. It should be appreciated that assist mechanism 109 is connected to longitudinal sides of the door 108 and opening 107 by suitable means such as fasteners (not shown).

In operation of the integrated bed side step assembly 110, during normal operating conditions, the door 152 is located in the side 22 of the bed 16 in an up or closed position in the opening 132 of the bed opening assembly 125. The door 108 is located in the side 104 of the bed cap 100 in a down or closed position in the opening 107 of the bed cap 100. An operator moves the handles 108b and 178 to actuate the latches 168 to disengage the latches 168 from the strikers 176. The doors 108 and 152 open in a clamshell fashion and rotated to their respective open positions. Once the doors 108 and 152 are in the open position, the operator can access the cargo area 18 located in the bed 16 through the openings 107 and 132. It should be appreciated that the operation is reversed for closing the doors 108 and 152.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. An integrated bed side step assembly for a pick-up truck having a bed, said integrated bed side step assembly comprising:
   a body opening assembly forming one side of the bed and having a body opening extending therethrough in the one side of the bed above a floor of the bed to allow access to an interior of the bed;
   a door assembly operatively cooperating with said body opening assembly and pivotal about a horizontal axis to open and close said body opening, said door assembly having at least one step therein to allow an operator to step up into and access the interior of said bed; and
   a pillar assembly disposed on opposed sides of said body opening and adapted to be secured to a rail of the vehicle to form a generally U-shaped structure around said body opening.

2. An integrated bed side step assembly as set forth in claim 1 wherein said body opening assembly includes an inner panel and an outer panel connected to said inner panel, said inner panel having a first opening and said outer panel having a second opening, said first opening and said second opening forming said body opening.

3. An integrated bed side step assembly as set forth in claim 2 wherein said pillar assembly is connected to said inner panel and said outer panel.

4. An integrated bed side step assembly as set forth in claim 1 wherein said door assembly comprises a door and a hinge to pivotally connected said door to said body opening assembly.

5. An integrated bed side step assembly as set forth in claim 4 wherein said door comprises an inner panel and an outer panel joined to said inner panel, said inner panel having said at least one step.

6. An integrated bed side step assembly as set forth in claim 4 wherein said door assembly includes at least one latch connected to said door and at least one striker connected to said body opening assembly to latch said door in a closed position in said body opening.

7. An integrated bed side step assembly as set forth in claim 6 wherein said door assembly includes a handle connected to said door and cooperating with said at least one latch to actuate said at least one latch to disengage said at least one striker.

8. An integrated bed side step assembly as set forth in claim 4 wherein said door assembly includes at least one cable having one end connected to said door and another end connected to said bed opening assembly.

9. An integrated bed side step assembly as set forth in claim 4 wherein said door assembly includes at least one skid pad attached to said door to resist slippage.

10. An integrated bed side step assembly as set forth in claim 4 including a cover disposed over an end of said door for covering the end of said door.

11. An integrated bed side step assembly as set forth in claim 1 including a bed cap disposed over the bed for covering the bed and having one side with an opening extending therethrough above the interior of the bed.

12. An integrated bed side step assembly as set forth in claim 11 wherein bed cap includes a door and a hinge to pivotally connect said door to said side of said bed cap.

13. A pick-up truck comprising:
   a bed having a front, floor and sides extending upwardly and along said sides;
   a body opening assembly forming one of said sides and having a body opening extending therethrough in the one of said sides above said floor to allow access to an interior of said bed;
   a door assembly operatively cooperating with said body opening assembly and pivotal about a horizontal axis to open and close said body opening, said door assembly having at least one step therein to allow an operator to step up into and access the interior of said bed; and
   a pillar assembly disposed on opposed sides of said body opening and adapted to be secured to a rail of the vehicle to form a generally U-shaped structure around said body opening.

14. A pick-up truck as set forth in claim 13 wherein said body opening assembly includes an inner panel and outer panel, said inner panel having a first opening and said outer panel having a second opening, said first opening and said second opening said body opening.

15. A pick-up truck as set forth in claim 14 wherein said pillar assembly is connected to said inner panel and said outer panel.

16. A pick-up truck as set forth in claim 13 wherein said door assembly comprises a door and a hinge to pivotally connected said door to said body opening assembly.

17. A pick-up truck as set forth in claim 16 wherein said door comprises an inner panel and an outer panel joined to said inner panel, said inner panel having said at least one step.

18. A pick-up truck as set forth in claim 16 wherein said door assembly includes at least one latch connected to said door and at least one striker connected to said body opening assembly to latch said door in a closed position in said body opening.

19. A pick-up truck as set forth in claim 13 including a bed cap disposed over said bed for covering said bed and having one side with an opening extending therethrough above the interior of said bed.

20. A pick-up truck as set forth in claim 19 wherein bed cap includes a door and a hinge to pivotally connect said door to said side of said bed cap.

* * * * *